Patented July 25, 1950

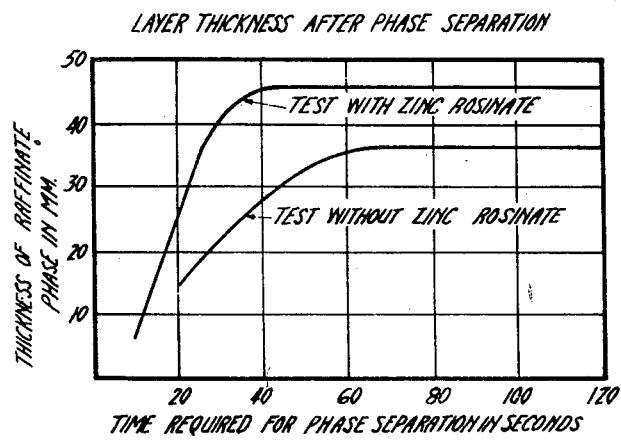
FIG. I
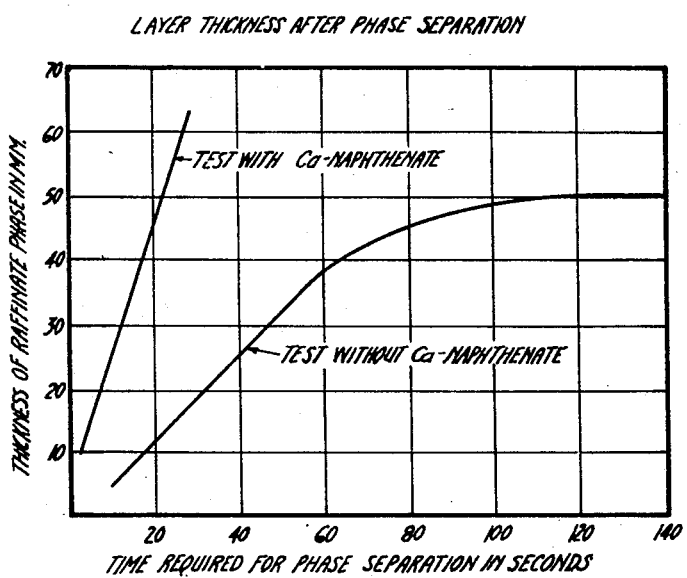
FIG. II

2,516,614

UNITED STATES PATENT OFFICE 2,516,614

ALICYCLIC MONOCARBOXYLATES IN HYDROCARBON EXTRACTION

Martinus Buis, Amsterdam, Netherlands, assignor to Shell Development Company, San Francisco, Calif., a corporation of Delaware Application February 10, 1947, Serial No. 727,596
In the Netherlands March 20, 1944

Section 1, Public Law 690, August 8, 1946
Patent expires March 20, 1964

5 Claims. (Cl. 196—14.25)

This invention relates to an improved process of liquid-liquid solvent extraction process. More particularly, it deals with a method for increasing the rate of phase separation of the liquid hydrocarbons from the solvent in a liquid-liquid solvent extraction process for hydrocarbons by carrying out the extraction in the presence of a small amount of a salt of a polyvalent metal with an alicyclic monocarboxylic acid.

Liquid-liquid solvent extraction processes comprise contacting a liquid mixture to be extracted with a liquid selective solvent for one of the components of that mixture either in a mixer and settler combination or countercurrently through a vessel such as a packed tower. The solvent is at least partially immiscible with the mixture under the conditions of the extraction, so that two liquid phases are formed which are separated and the solvent in either or both of these phases is then removed and may be recycled for contact with more of the unextracted mixture.

A serious difficulty which is often encountered in the solvent extraction of hydrocarbon oils and the like, is an unduly long period of time required for settling or separation of the two liquid phases of the process. This is true of extraction processes as applied to both wax-containing and wax-free oils. Thus in such solvent extraction processes, more or less stable emulsions of oil in a selective solvent may be produced. Such emulsion formation unfavorably affects the efficiency of the extraction process and the properties of the raffinate, in view of the entrainment of extract in the raffinate phase and of raffinate in the extract phase. The entrainment of extract in the raffinate phase renders it necessary to extract more intensively than would be required under normal conditions in the absence of such entrainment, the yield being adversely affected thereby. The entrainment of raffinate in the extract phase gives rise to losses.

It has now been found that the above indicated objects and concomitant economies of operation may be accomplished in liquid-liquid solvent extraction processes by the method which comprises carrying out such extractions of oil mixtures in the presence of a small amount of a salt of a polyvalent metal with an alicyclic monocarboxylic acid. When carrying out such extractions in the presence of a small amount of a salt of a polyvalent metal with an alicyclic monocarboxylic acid resulting emulsions are effectively split up or the formation thereof is materially hampered.

More specifically, it has been found that a marked enhancement of the separation of the raffinate and extract phases may be obtained when refining mineral oils or mineral oil fractions, such as gasolines and lubricating oils, by extraction with the aid of selective solvents, such as furfural, cresol, nitrobenzene or solvent mixtures, said enhancement ensuing when the extraction is carried out in the presence of a small amount of a salt of a polyvalent metal with an alicyclic monocarboxylic acid. These substances include various metal salts of various alicyclic monocarboxylic acids, e. g. calcium, aluminum, magnesium, lead, cobalt, copper and the like metal naphthenates, zinc, calcium, aluminum and the like polyvalent metal salts of abietic acid, d-pimaric acid, l-pimaric acid, dihydroabietic acid, tetrahydroabietic acid, dehydroabietic acid, heat treated rosin, and the like resinic acids.

Previously, wax crystal modifying substances such as aluminum and magnesium stearates and palmitates and aluminum and lead naphthenates have been used in processes for the liquid dewaxing-solvent separation of petroleum waxes from wax-bearing oils. In such processes the wax crystal modifying substances serve to modify the crystal form of the precipitated waxes to produce a crystalline mass which is more readily filtered and thus separated from the dewaxing-solvent and residual liquid hydrocarbon oil components. Also, it has been known that some wax-crystal modifiers such as Montan wax and aluminum stearate are of substantial benefit in preventing the formation of emulsions involving hydrocarbon oils and selective solvents therefor which are difficult to break. However, it has not been suggested that naphthenates such as calcium naphthenate or resinates such as zinc rosinate are valuable, especially when used in very small proportions, in preventing the formation of emulsions or in splitting-up of emulsions formed in liquid-liquid solvent extractions of hydrocarbon oils and the like substances.

As a result of the greater rate of phase separation when practicing the present invention the throughput through a given equipment can normally be increased considerably since settling rate is usually the limiting factor. Or else for a given throughput the yield and/or quality of the products may be improved due to reduced carry-over. In an extraction tower the number of theoretical extraction stages may increase materially for a given feed rate because of a reduced tendency to carry finely suspended droplets of materials in the wrong direction.

The proportions in which the phase separation assistants or demulsifiers of the invention are used, preferably should be chosen so that the emulsion of raffinate in extract phase is just split up. In general these quantities amount to less than 1% and not less than about .001% by weight, preferably less than about 0.5% and more than about 0.01% by weight, calculated on the oil being extracted. If too great an amount of the demulsifiers is used, it will have the effect of inverting the emulsion tendency, thereby increasing the stability of solvent in hydrocarbon emulsions and defeating the purpose of the invention. It will be understood that the amount of demulsifier to be used in any particular application of the invention will depend upon several factors, namely: the type of solvent employed in the process; the type of mixture to be separated in the process; the components in the mixture which affect emulsibility; the molecular weight and the acid equivalent of the acid radical of the demulsifier; etc. For example, if the naphthenic acids of the naphthenate demulsifiers have low acid numbers, a greater amount is required to produce a given settling time, than if acids of higher acid number had been used. Similarly, if the resinic acids of the resinate demulsifiers have low acid numbers, a greater amount is required to produce a given settling time, than if acids of higher acid number had been used.

The naphthenates may be derived from any suitable source. They are most easily produced by simply neutralizing naphthenic acids with lime, aluminum hydroxide, zinc oxide, and the like.

The resinates may be derived from any suitable source. Zinc rosinate, for example, is readily obtainable from the treatment of ordinary pale pinewood rosin with zinc oxide. Suitable compositions of dihydro-, tetrahydro-, and dehydro-abietic acid may be produced by methods well known in the treatment of rosin and abietic acid, and these derivatives may be readily converted to the desired salts by interaction as is well known with the selected metal oxide or hydroxide.

The phase separation assistant or demulsifier may be added continuously or intermittently either to the material being extracted or to the selective solvent, or to both. In the course of the extraction, most of the demulsifying agent goes into the extract phase from which it may be recovered, and, if desired, may be returned to the extraction zone. A small portion may remain in the raffinate phase.

The desirability or necessity of removing all or part of the demulsifying agent from the separate phases after separation of the raffinate and extract phases, in the event such removal has not occurred as a result of removal of the solvent from the respective phases, will depend on the use of the raffinate oil or extract oil, or both. Removal can normally be achieved by means such as distillation, the demulsifier salt remaining in the residue from the distillation; or acidification and distillation, in which case the naphthenic or resinic acid may distill overhead; or clay treatment, the alicyclic monocarboxylate, i. e. the naphthenate or resinate, being retained by the adsorbent clay; etc.

For some uses, the presence of the naphthenate or resinate in the extracted oil may be decidedly beneficial. Thus, in lubricants it may act as a detergent; in spray oils it may cause increased deposition of toxic agent; in asphalts b'ended with extract oil containing the naphthenate or resinate, the adhesion toward mineral aggregate may be improved.

Some suitable liquid selective solvents which may be employed in the separation of hydrocarbon mixtures are: phenol, cresylic acids, alkyl phenol mixtures, aniline, alkyl anilines, diphenyl amine, ditolyl amines, carbitols (diethylene glycol monoethers) such as methyl, ethyl, propyl carbitols, chlorinated dialkyl ethers such as beta,beta-dichloroethyl ether, nitrobenzene, nitrotoluene, nitroxylenes, naphthols, alkyl naphthols, benzophenone, phenyl tolyl ketone, diphenylene ketone, alkyl phthalates such as dimethyl phthalate, alkyl salicylates such as methyl salicylate, benzyl alcohol, benz chlorides, i. e., benzyl, benzal and benzo-chlorides, benzonitrile, diphenyl oxide, substituted diphenyl oxide which may contain amino, nitro, hydroxy, etc., radicals; ditolyl oxide, hydroxy pyridine, quinolines, chlorinated quinoline, hydroxy quinoline, 5-nitro-quinoline, the picolines, refinery N-bases, tetrahydrofurfuryl alcohol, furfuryl alcohol, furfural, monoglycerol ethers such as 1-methoxy glycerol, 2-methoxy glycerol, 1-ethoxy glycerol, propoxy glycerols, glycerol diethers such as 1,2-dimethoxy glycerol, 1,3-dimethoxy glycerol, 1,3-dipropoxy glycerol, 1,2-diisopropoxy glycerol, glycerol mixed diethers such as 1-ethoxy, 2-methoxy glycerol, antimony trichloride, crotonaldehyde, various sulfones, sulfolanes, 2-sulfolenes, sulfoxides, aliphatic sulfones, etc.

The following examples illustrate the effectiveness of this invention:

EXAMPLE I

Two comparable tests were carried out in which 1 volume of lubricating oil distillate and 3 volumes of furfural respectively were emulsified under certain conditions, either with or without the addition of 0.001% by weight of zinc rosinate, calculated on the oil; an oil-in-furfural emulsion was thus obtained. The time required for a complete separation of the phases was then determined.

The data represented in the graph of Fig. I of the accompanying drawing, in which the thickness of the growing clear oil layer has been set out as a function of time, plainly shows that the addition of the zinc rosinate results in an appreciably more rapid and better separation of the phases.

Similar tests were made using 0.01% and 0.1% respectively, by weight of zinc rosinate. The resulting settling-curves were the same as the one with 0.001% by weight of zinc rosinate.

When a similar test was made using 1% by weight of zinc rosinate a large part of the furfural phase was emulsified in the oil phase and a relatively stable emulsion was obtained.

EXAMPLE II

A pair of comparable tests, similar to those described in Example I, was carried out, but this time with the addition of 0.05% by weight of calcium naphthenate, calculated on the oil.

In this case too, as appears from the graphical representation in Fig. II of the accompanying drawing, the addition of the calcium naphthenate resulted in a still more rapid separation of the phases.

EXAMPLE III

A lubricating oil distillate was extracted in three stages with 2.9 volumes of furfural in each stage, at temperatures of 70°, 85°, and 97° C., respectively, either with or without the addition of 0.015% by weight of calcium naphthenate.

From the results shown in the table below it is seen that in the third stage a nearly 9% higher yield of raffinate was obtained, while the quality of the raffinate obtained in the test in which calcium naphthenate was added was better than that of the raffinate in the production of which there was no use of calcium naphthenate.

Table

| Stage | Without additions | | | With addition of 0.015% by weight Ca-naphthenate | | |
|---|---|---|---|---|---|---|
| | Yield | $n_D$-raff. | $n_D$-extr. | Yield | $n_D$-raff. | $n_D$-extr. |
| | Per cent | | | Per cent | | |
| I | 73.2 | 1.4808 | 1.5345 | 81.2 | 1.4790 | 1.5351 |
| II | 60.0 | 1.4730 | 1.5284 | 68.7 | 1.4715 | 1.5170 |
| III | 44.6 | 1.4693 | 1.5170 | 53.2 | 1.4678 | 1.5133 |

I claim as my invention:

1. In a liquid-liquid solvent extraction process for the separation of a hydrocarbon mixture with a selective solvent, the improvement which comprises carrying out said extraction in the presence of a minor amount less than 1% by weight of a salt of a polyvalent metal with an alicyclic monocarboxylic acid, exclusive of polyvalent metal salt of naphthenic acid, in said hydrocarbon mixture, said amount being insufficient to cause a stable solvent-in-hydrocarbon emulsion.

2. In a liquid-liquid solvent extraction process for the refining of a mineral lubricating oil with a selective solvent, the improvement which comprises carrying out said extraction in the presence of a minor amount less than 1% by weight of a salt of a polyvalent metal with an alicyclic monocarboxylic acid, exclusive of polyvalent metal salt of naphthenic acid, in said lubricating oil, said amount being insufficient to cause a stable solvent-in-oil emulsion.

3. In a liquid-liquid solvent extraction process for the separation of a hydrocarbon mixture with a selective solvent, the improvement which comprises carrying out said extraction in the presence of a minor amount less than 1% by weight of a polyvalent metal salt of a resinic acid in said hydrocarbon mixture, said amount being insufficient to cause a stable solvent-in-hydrocarbon emulsion.

4. In a liquid-liquid solvent extraction process for the separation of a hydrocarbon mixture with a selective solvent, the improvement which comprises carrying out said extraction in the presence of from about 0.001% to about 1% by weight of zinc rosinate in said hydrocarbon mixture, said amount being insufficient to cause a stable solvent-in-hydrocarbon emulsion.

5. In a liquid-liquid solvent extraction process for the refining of a mineral lubricating oil with a selective solvent, the improvement which comprises carrying out said extraction in the presence of a minor amount less than 0.1% by weight of a polyvalent metal rosinate in said lubricating oil, said amount being insufficient to cause a stable solvent-in-oil emulsion.

MARTINUS BUIS.

REFERENCES CITED

The following references are of record in the file of this patent:

UNITED STATES PATENTS

| Number | Name | Date |
|---|---|---|
| 2,383,768 | Buis et al. | Aug. 28, 1945 |
| 2,411,105 | Nixon et al. | Nov. 12, 1946 |